United States Patent
Oda (10) Patent No.: US 7,565,361 B2
(45) Date of Patent: Jul. 21, 2009

(54) METHOD AND SYSTEM FOR LEXICAL MAPPING BETWEEN DOCUMENT SETS HAVING A COMMON TOPIC

(75) Inventor: Hiromi Oda, Suginami-ku (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 547 days.

(21) Appl. No.: 11/103,567

(22) Filed: Apr. 12, 2005

(65) Prior Publication Data

US 2005/0240394 A1     Oct. 27, 2005

(30) Foreign Application Priority Data

Apr. 22, 2004   (JP)  ............... 2004-127122

(51) Int. Cl.
*G06F 17/00* (2006.01)
*G06F 17/30* (2006.01)
*G06F 7/00* (2006.01)
*G06F 17/28* (2006.01)
*G06F 17/27* (2006.01)

(52) U.S. Cl. .............. 707/100; 707/3; 707/5; 707/104.1; 704/2; 704/9

(58) Field of Classification Search .......... 704/2, 704/9; 707/3, 5, 100, 104.1
See application file for complete search history.

(56) References Cited

U.S. PATENT DOCUMENTS 5,778,362 A * 7/1998 Deerwester ............... 707/5
6,137,911 A * 10/2000 Zhilyaev ................. 382/225
6,510,406 B1 * 1/2003 Marchisio ................ 704/9
6,847,966 B1 * 1/2005 Sommer et al. ........... 707/5

FOREIGN PATENT DOCUMENTS

JP    2002-236681    8/2002
JP    2002-328920    11/2002

OTHER PUBLICATIONS

Sebastiani, Fabrizio. "Machine Learning in Automated Text Categorization." ACM Computing Surveys, vol. 34, No. 1, Mar. 2002, pp. 1-47.*
Cohen et al. "Context-Sensitive Learning Methods for Text Categorization." ACM Transactions on Information Systems, vol. 17, No. 2, Apr. 1999, pp. 141-173.*
Dunning, T., "Accurate Methods for the Statistics of Surprise and Coincidence," *Computational Linguistics*, vol. 19(1), pp. 61-74 (1993).

(Continued)

*Primary Examiner*—Apu M Mofiz
*Assistant Examiner*—Charles E Lu (57) ABSTRACT

Terms (e.g., words) used in an expert domain that correspond to terms in a naive domain are detected when there are no vocabulary pairs or document pairs available for the expert and naive domains. Documents known to be descriptions of identical topics and written in the expert and naive domains are collected by searching the Internet. The frequencies of terms that occur in these documents are counted. The counts are used to calculate correspondences between the vocabularies of the expert and naive language expressions.

10 Claims, 10 Drawing Sheets

OTHER PUBLICATIONS

Kumamoto, T. and Ohta, K., "Proc. of the Eighth Annual Meeting of The Ass'n for Nat. Lang. Processing," The Ass'n for Nat. Lang. Processing, Comm. Res. Lab.,pp. 483-486 (2002).

Fujita, A., Inui, K. and Matsumoto, Y.,"Proc. of the 65th Annual Meeting of the Ass'n for Info. Processing," Info. Processing Soc'y of Japan, vol. 5, 1T6-4, pp. 99-102 (2003).

Murayama, K. et al., "Proc. of the 9th Annual Meeting of the Ass'n for Nat. Lang. Processing," The Ass'n for Nat. Lang. Processing, pp. 85-88 (2003).

Kida, Y. et al., "Proc. of the 10th Annual Meeting of the Ass'n for Nat. Lang. Processing," The Association for Nat. Lang. Processing, pp. 253-256 (2004).

* cited by examiner

METHOD AND SYSTEM FOR LEXICAL MAPPING BETWEEN DOCUMENT SETS HAVING A COMMON TOPIC

CROSS-REFERENCE TO RELATED APPLICATION

The present application is based on, and claims priority from, Japanese Application No. 2004-127122, filed Apr. 22, 2004, the entire disclosure of which is hereby incorporated by reference herein.

FIELD OF THE INVENTION

The present invention is concerned with processing plural sets of documents having a common topic.

BACKGROUND ART

Documents having multiple descriptions in the same language and that share the same content frequently employ terms in those descriptions that differ depending upon the degree of specialized knowledge the authors have about the topic and the different social strata, such as sex or age groups, to which the authors belong. Even if the descriptions are about a common topic, terms used by a non-expert and terms used by an expert in their respective expression domains can be quite different.

It is an object of the present invention to provide a new and improved method of, apparatus and other necessary technologies for detecting terms used by a non-expert that correspond to what are meant by the terms used by an expert and, conversely, detecting the terms used by an expert that correspond to what are meant by the terms used by a non-expert between such different domains.

A typical example of technology for converting documents in different domains is a translation machine. Technology that makes a computer perform the task of a translation machine has been known for some time. A translation machine automatically translates a document written in a natural language into another natural language with a computer program using a term database, a program for processing grammatical rules, databases of usage and sentence examples, and other system specific components. Such technology has already been put to practical use, and there are commercial language translations software products for personal computers. Some translation services are also provided on the Internet. In addition, small hand-held devices for word-by-word translation are widely available. A word-by-word translation machine converts one word in a certain language into a word in another language with an identical meaning. Basically, precompiled dictionaries are stored in a storage device, and an input word is converted into a corresponding word in another language. These conventional technologies have a precondition for converting documents from one domain to another domain; namely, a sentence in one domain must be known to correspond to a sentence in the other domain and a word in one domain must be known to correspond to a word in the other domain.

Paraphrasing research for converting a difficult expression into an easier expression in an identical language have already been published. For example, there is reported research by Atsushi Fujita, et al. (2003) and Masahiro Murayama, et al. (2003). In the research concerning "paraphrasing," the basic technique is to find expression patterns to be replaced by predetermined expression patterns according to pattern matching rules. Other approaches in language translation utilize statistical and/or probabilistic models. These model-based approaches initially prepare a pair of data sets, in different languages, having contents that are known to be the same. Next, based on information, such as the sentence lengths in each data set, corresponding sentences in language A and language B are determined. Finally, the correspondences between words are determined based on their co-occurrence relations in the data sets. In this and the other prior art cases, there is a premise that there is a word Wb in the language B that corresponds to a word Wa of the language A with a reasonable semantic accuracy.

[Patent Document 1] "Daily Language Computing and its Method" JP 2002-236681 A

[Patent Document 2] "Association Method for Words in Paginal Translation Sentences" JP 2002-328920 A

[Non-Patent Document 1]
http://www2.crl.go.jp/it/al33/kuma/mrs_li/midisearch.htm.

[Non-Patent Document 2]
Atsushi Fujita, Kentaro Inui, Yuji Matsumoto. "Text Correction Processing necessary for Paraphrasing into Plain Expressions". Collection of Lecture Theses in $65^{th}$ National General Meeting of Information Processing Society of Japan, $5^{th}$ Separate Volume, 1T6-4, pp. 99-102, 2003.03.

[Non-Patent Document 3]
Masahiro Murayama, Masahiro Asaoka, Masanori Tsuchiya, Satoshi Sato. "Normalization of Terms and Support for Paraphrasing Declinable words based on the Normalization", Language Processing Society, $9^{th}$ Annual General Meeting, pp85-88, (2003.3).

[Non-Patent Document 4] Dunning, T. (1993). Accurate methods for the statistics of surprise and coincidence. Computational Linguistics, 19(1): 61-74

As described above, in conventional machine translation, it is assumed that there are corresponding words in the two languages in question, and that corresponding document sets are available, on translation from one language to the other.

An object of the present invention is to provide a new and improved method of and apparatus for detecting a term used in one domain that approximately corresponds to a term in the other domain, and/or vice versa, even in the cases where there are no (1) known word pairs that correspond to each other in target domains, (2) document set pairs that are known to correspond to each other in advance, and/or (3) dictionaries or thesauri to aid the mappings in the domains in question.

SUMMARY OF THE INVENTION

According to one aspect of the present invention, in order to solve the above-mentioned problems, (1) document sets written in two different kinds of language expressions, which are known to be written about an identical topic (these documents are referred to as a document in domain A and a document in domain B, hereafter), are retrieved, and (2) when such document sets of two different kinds of language expressions are given, associations between terms appearing in the document in domain A and terms in the document in domain B are established.

For this purpose, candidate documents are collected using a predetermined keyword list with a retrieval tool in order to prepare document sets written in two different kinds of language expressions. However, since candidate documents retrieved with a retrieval tool include a large number of so-called "noise" documents, results of the retrieval cannot, in many cases, be used as they are. Thus, an aspect of the present invention includes an initial step of removing the "noise" documents from the collected documents. After this initial step, the documents are classified into expert documents and naive documents that contain different types of language expressions based on the term frequencies and other information in the documents. Since terms appearing in a target expert document and a target naive document are not always identical, correlations between the terms in the two different domains are calculated next. The basic concept is as follows: associations of a term or a set of terms that appear in either of the expert or naive domains and a term or a set of terms that appear in the other domain are obtained on the basis of co-occurrence relations among the terms in the expert document set and a naive document set that are known to be written about an identical object.

An example of an application of the present invention is a recommendation system for customers who are about to buy some products or goods. Even if documents are written about an identical object, such as merchandise, there are usually considerable differences between terms used by an expert with deep knowledge about the object and terms used by a non-expert with little knowledge about it. The expert often describes an object using technical terms and knowledge specific to the object, but the non-expert, without such knowledge, cannot but describe the object with expressions based on perceptions or by way of similar objects or examples. The expert tries to explain the product in detail with his/her knowledge about where it was made and/or what material it is made from, while the non-expert tries to describe the same product using perception-based terms that come to mind. It is almost impossible for a general consumer to have detailed knowledge of products and proper names concerning products in all fields of interest. Thus, even if an expert explains and recommends, to a non-expert, a particular product, which in fact requires specialized knowledge to choose wisely, it is conceivable that the non-expert may not understand the explanation sufficiently before the purchase.

By applying the present invention, the seller is able to provide the sufficient information about the product to consumers in a vocabulary the consumers understand, and conversely, the general consumer can easily understand the information about products and select the information that suits to his/her preferences and tastes.

DETAILED DESCRIPTION OF THE DRAWINGS

Figure 1:
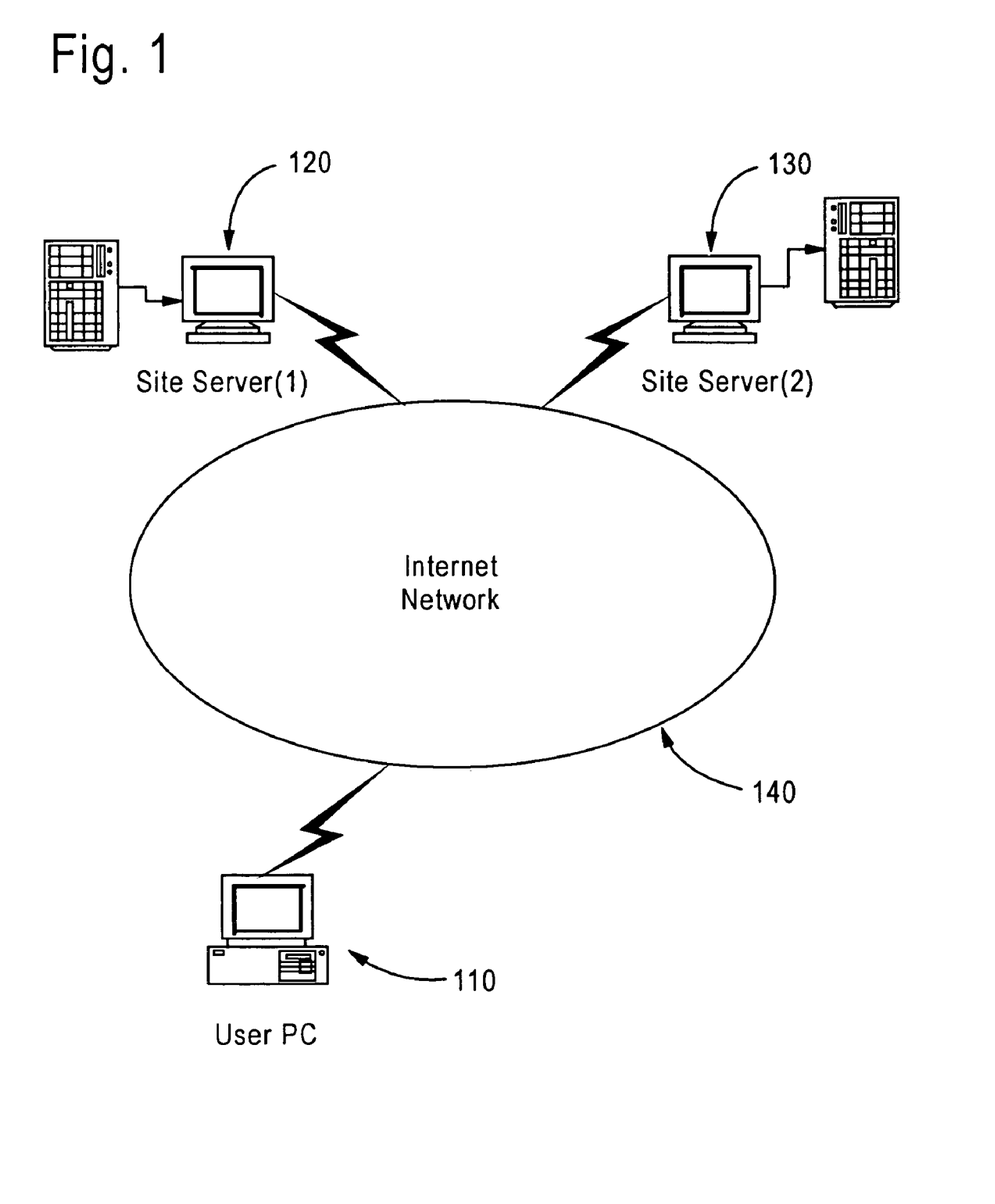
FIG. 1 is a diagram of an entire system for carrying out a preferred embodiment of the present invention.

FIG. 1 is a diagram of a system including a user PC 110, a site server (1) 120, and a site server (2) 130 that are connected to a network 140. A user accesses the site server (1) 120, and the site server (2) 130 to acquire necessary information by using some retrieval tool through operation of PC 110. Retrieval on the Internet is described as the FIG. 1 embodiment. However, other retrieval systems can be used as long as the system can retrieve the necessary information. The user can obtain a desired result by processing obtained information with a computer program on the user PC 110.

Figure 2:
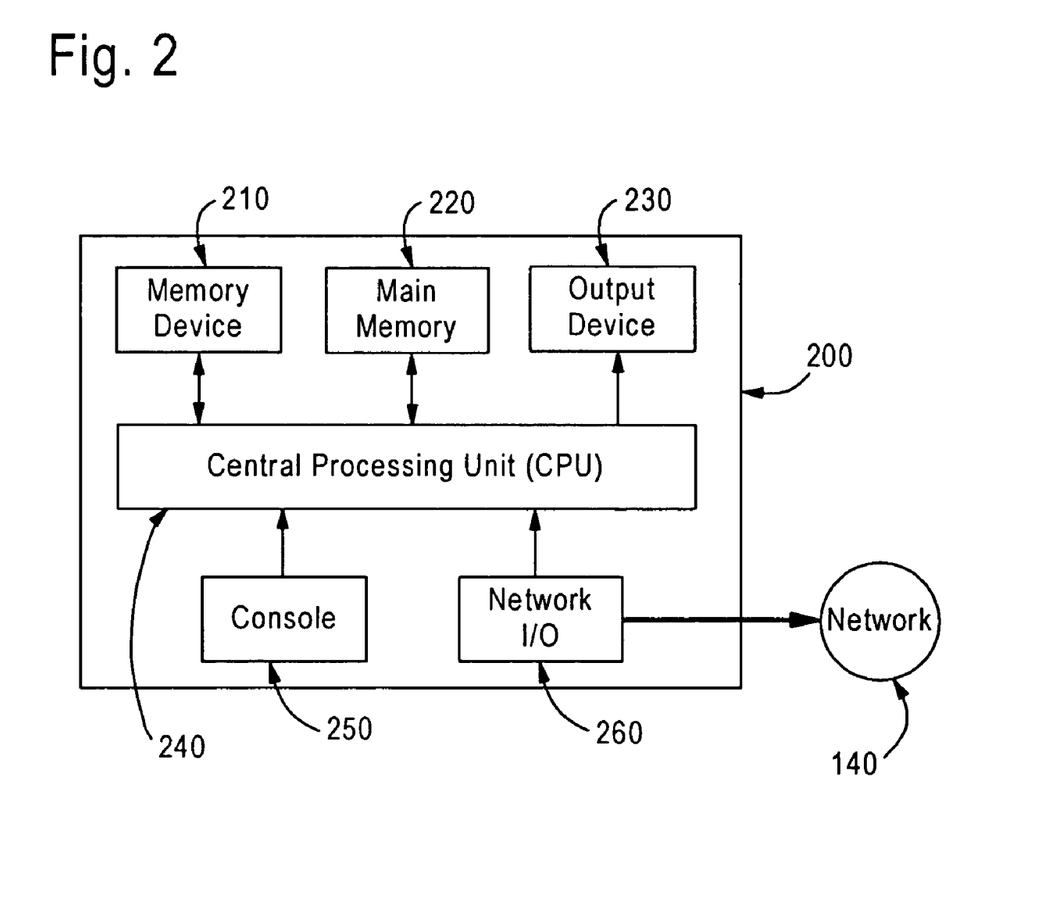
FIG. 2 is a diagram of an apparatus included in the system of FIG. 1.

FIG. 2 is a diagram of a user PC including a housing 200 having a storage device 210, a main memory 220, an output device 230, a central processing unit (CPU) 240, a console 250, and a network I/O 260. The user operates the console 250 to acquire necessary information from each site on the Internet through the network I/O 260. The central processing unit 240 performs predetermined data processing for the information retrieved from the Internet on the basis of document information stored in the storage device 210 and displays a result on the output device 230.

Figure 3:
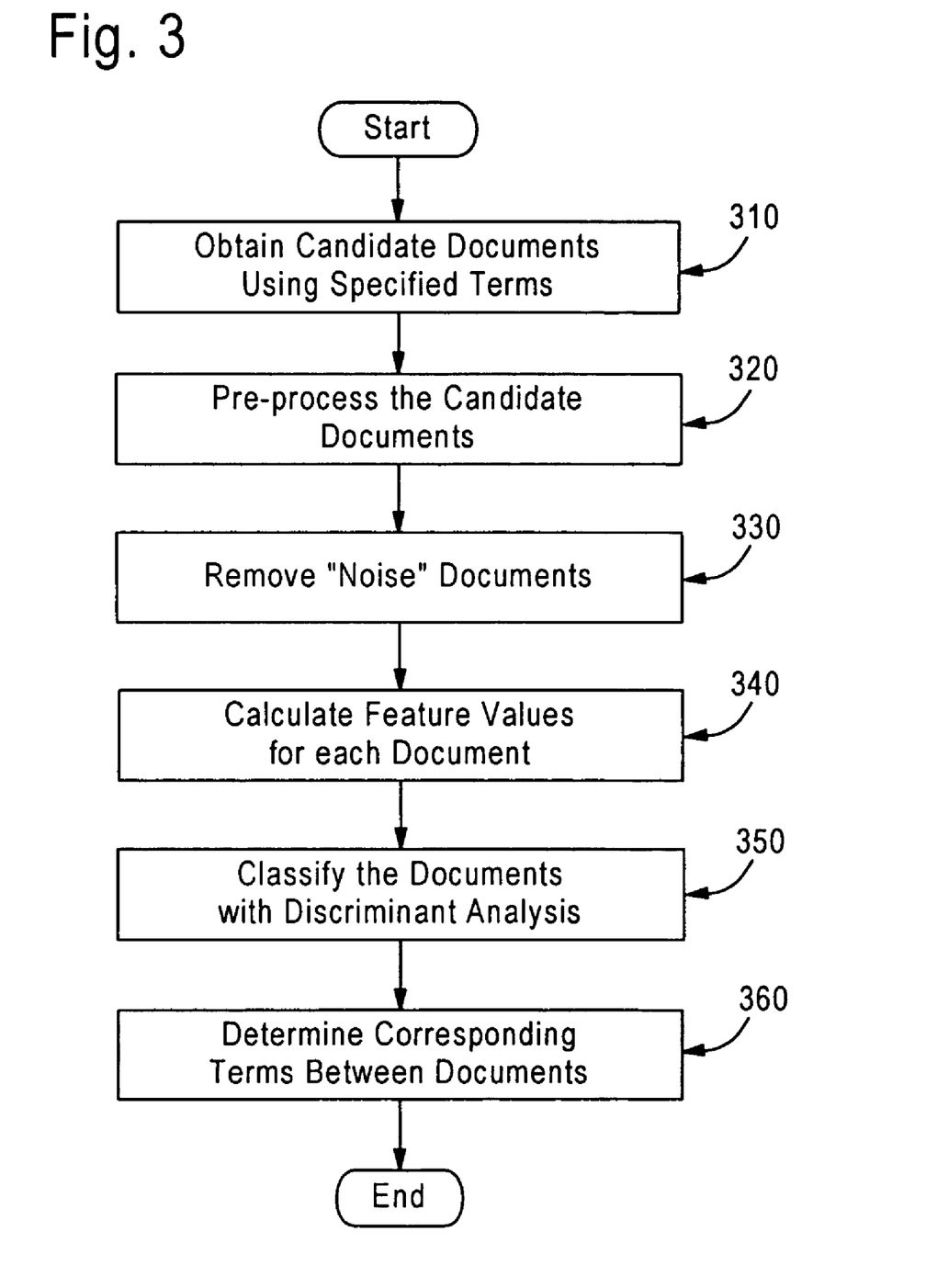
FIG. 3 is a flowchart of an algorithm performed by the system of FIG. 1.

FIG. 3 is a flowchart of operations (i.e., steps) performed by the system of FIG. 1 and the PC of FIG. 2 to detect corresponding terms between naive and expert documents. The steps are:

Step 310: Obtain candidate documents using specified terms.

Step 320: Pre-process the candidate documents.

Step 330: Remove "noise" documents.

Step 340: Calculate feature values for each document.

Step 350: Classify the documents with discriminant analysis.

Step 360: Detect corresponding terms between naive and expert documents.

Each step is described in the following in detail.

(1) Obtain Candidate Documents Using Specified Terms

The first step in detecting the corresponding terms (step 310) is to prepare a data set comprising pairs of a naive document (document written by a non-expert, hereinafter referred to as N document) and an expert document (documents written by an expert, hereinafter referred to as E document) describing the same contents. The data set is prepared by using a term list.

The term list is a set of terms which can be used as keywords in a given domain. For example, when the domain of "wine" is selected, the term list includes a "(product) names of wine". A user collects information on wine using a retrieval tool on the Internet in accordance with wine names described in the term list. Wine names, such as "Auslese," "Chateau Cure Bon," "Chateau Margaux," or "Vin Santo Toscano," are designated. Candidate documents are retrieved from a database with those terms as keywords. Any database can be used as long as the database stores such information. A method of retrieving candidate documents using a search engine on the Internet is now described.

The user performs retrieval with wine names, which are defined as search keys in the above-mentioned term list. The wine names are retrieved by using a search engine, which is available as a commercial product or as free software. Usually, when the wine names are specified as search keys, a large number of candidate documents are retrieved. However, a predetermined number of candidates can be selected in accordance with some ranking. It is possible to obtain candidate documents automatically for all desired terms by using the term list.

(2) Pre-process the Candidate Documents (Step 320)

Documents obtained automatically from web pages on the Internet in this fashion include various kinds of information and cannot, in many cases, be used as they are. Documents that correspond to garbage-type documents, list-type documents, and diary-type documents are removed as "noise" documents from the automatically obtained documents. Before removing the "noise" documents, pre-processing is applied to documents extracted from the web pages. In the first phase of pre-processing, portions that can be regarded as documents are extracted from the information of the web pages to perform document analysis. Next, the documents are segmented into words to extract content words, particles, auxiliary words, and so on, to enable calculation of feature values for these documents; that is, values of the number of content words, a ratio of naive words, the ratio of proper nouns, the ratio of additional proper nouns, and the ratio of particles/auxiliary words. Conceptual terms used in this specification in order to calculate those feature values are described in the following.

(i) Number of Content Words

This is the number of content words included in the documents in a web page. Content words include nouns, verbs, adjectives, and adverbs excluding particles/auxiliary words.

(ii) Ratio of Naive Words=Number of Naive Words/Number of Content Words

Naive words are predetermined words that are used by non-experts in the pertinent field. The ratio of naive words is the ratio of the number of predetermined naive words (referred to as "master naive words" hereafter) appearing in one web page to the number of content words.

(iii) Ratio of Proper Nouns=Number of Proper Nouns/Number of Content Words

Proper nouns in this context are nouns that are generally known as proper nouns. The ratio of proper nouns is the ratio of the number of proper nouns appearing in one web page to the number of content words.

(iv) Ratio of Additional Proper Nouns=Number of Additional Proper Nouns/Number of Content Words Additional proper nouns are nouns that are not generally recognized as proper nouns but need to be added as proper nouns in order to detect the corresponding terms. The ratio of additional proper nouns is the ratio of the number of additional proper nouns appearing on one web page to the number of content words.

(v) Ratio of Particles/Auxiliary Words=Number of Particles/Number of Auxiliary Words/Number of Content Words The ratio of particles/auxiliary words is calculated by calculating the ratio of the number of particles to the number of auxiliary words appearing in one web page and dividing the ratio by the number of content words to normalize the ratio.

(vi) Content-word N-gram

Correlations between documents are checked by using content-word uni-grams, content-word bi-grams, content-word tri-grams, and content-word skip bi-grams.

The content-word uni-gram is used for determining correlations between documents on the basis of the frequency of one word (or term). In the case of the wine domain, frequencies of words such as "wine", "flavor", and "drink" can be used.

The content-word bi-gram is used for determining correlations between documents on the basis of frequencies of two consecutive words. In the case of the wine domain, frequencies of two consecutive words such as "alcohol-percentage", "this-wine", and "producing country-age" are used.

The content-word tri-gram is used for determining correlations between documents on the basis of the frequencies of three consecutive words. In the case of the wine domain, frequencies of three consecutive words such as "wine-meal-way of drinking", "white-France-1990", and "red-Germany-Auslese" are used.

The content-word skip bi-gram uses the first and the last words in three consecutive words to determine correlations between documents on the basis of frequencies of these words. To give an example, "high quality" and "produce" can be designated as the first word and the last word of a bi-gram pattern. Since the resulting pattern requires "high quality-XXX-produce," sequences such as "high quality-bunches of fruits-produce," or "high quality-Riesling-produce", satisfy the condition. XXX indicates an arbitrary word.

(vii) Particle/Auxiliary-word N-gram

Similarly, particle/auxiliary-word uni-grams, bi-grams, tri-grams, particle/auxiliary-word bi-grams, particle/auxiliary-word tri-grams, and particle/auxiliary-word skip bi-grams are used.

Examples of particle/auxiliary-word uni-grams include "no", "ga", and "ni". Examples of the particle/auxiliary-word bi-grams include "no-ga", "no-no", and "no-ni". Examples of particle/auxiliary-word tri-grams tri-gram include "no-ga-ga", "no-no-ga", and "no-ni-ga".

Examples of particle/auxiliary-word skip bi-grams include "no-X-ga", "no-X-ga", and "no-X-ga". Note that "X" is an arbitrary particle or auxiliary word.

(viii) Rank Correlation Coefficients and Their Significance Values

In this embodiment, a rank correlation coefficient and a significance value are calculated using Spearman's formula. This will be explained with the content-word uni-gram as an example. First, frequencies of words such as "sake (liquor)", "kaori (flavor)", "nomu (drink)", "aji (taste)", "kanjiru (feel)", and "omou (think)" used in a master naive document are determined. Similarly, frequencies of words such as "sake (liquor)", "kaori (flavor)", "nomu (drink)", "aji (taste)", "kanjiru (eel)", and "omou (think)" used in a document obtained from a certain web site are determined. Next, ranks of the frequencies of these words are calculated for the respective documents. The Spearman's Rank Correlation Coefficient is calculated on the basis of these pieces of rank information, and the significance of the correlation coefficient is calculated.

(ix) Master Naive Document Set (or Master Expert Document Set)

A master naive document set is a collection of documents including terms used by non-experts in a certain domain. A master expert document set is a collection of documents including terms used by experts in a certain domain.

(3) Removing "Noise" Documents

Figure 4:
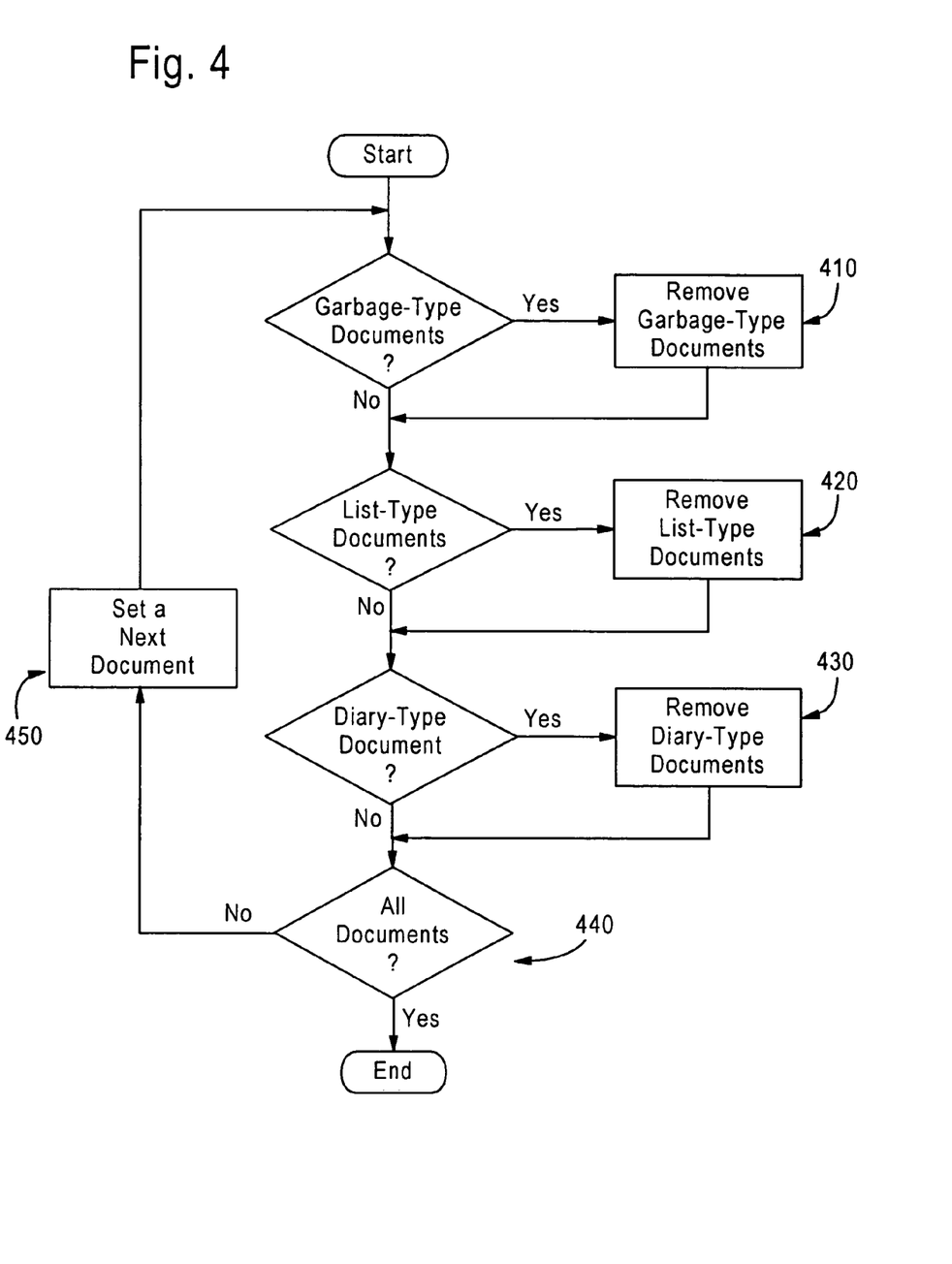
FIG. 4 is a flowchart of a method employed by the apparatus of FIG. 2 for removing "noise" documents from retrieved documents of the system of FIG. 1.

It is necessary to remove garbage-type documents, list-type documents, and diary-type documents as "noise" documents from documents retrieved from web pages on the Internet. It is considered that no information necessary for detecting a term used in one domain that approximately corresponds to a term used in another domain is included in the "noise" documents. FIG. 4 is a flowchart of steps performed by the system of FIG. 1 for removal of "noise" documents.

410: Remove garbage-type documents
420: Remove list-type documents
430: Remove diary-type documents
440: Confirm that removal has been executed for all documents
450: Set a next document Removal of the garbage-type list-type documents, and the diary-type documents are hereinafter described.

(A) Garbage-type Documents

Documents that satisfy all of the following conditions are defined as garbage-type documents. The garbage-type documents are literally garbage and cannot be used for term detection from one domain to another domain. The criteria for selection of the garbage-type document are defined as below.

(a) The number of its content words is small.
(b) Its ratio of naive words is low.
(c) Its ratio of proper nouns is low.
(d) Its correlation coefficient with "master naive documents" is low.

The "master naive document set" is a set of documents that are selected in advance as documents written by non-experts.

Alternatively, a set of documents selected in advance as documents by experts can be used as the "master expert document set".

(B) List-type Documents

Documents that satisfy all of the following conditions are defined as list-type documents. This happens in the case where information about an object in a certain domain is stored simply as a list at a site on the Internet.

(a) Its ratio of proper nouns is high.

(b) Its correlation coefficient with "master naive document" based on content words and particles/auxiliary words is low.

(C) Diary-type Documents

Documents satisfying all of the following conditions are defined as diary-type documents. A diary-type document is a type of document in which information on liquor and wine, for instance, is described but other topics or information are mainly discussed. Such a document may appear on Internet sites for personal diaries or online department stores that deal with liquor or wine and include many other topics.

(a) Its ratio of proper nouns concerning a certain domain is low.

(b) Its correlation with master documents based on content-word n-gram is low.

(c) Its correlation with master documents based on particle/auxiliary-word n-gram is high.

On the basis of the above definitions, garbage-type documents, list-type documents, and diary-type documents are removed from consideration in the term domain detection process because they are considered to be "noise" documents.

(4) Classify the Documents With Discriminant Analysis

After the removal of the "noise" documents, discriminant analysis is applied to classify the remaining documents into naive documents or expert documents. To perform the discriminant analysis, feature values are extracted from respective input documents. The feature values employed have five kinds of ratios; namely, the number of content words, the ratio of naive words, the ratio of proper nouns, the ratio of additional proper nouns, and the ratio of particles/auxiliary words. Moreover, the Spearman's Correlation Coefficient and its significance value calculated from the content-word n-gram, and the Spearman's Rank Correlation Coefficient and its significance value calculated from the particle/auxiliary-word n-gram are used.

Figure 5:
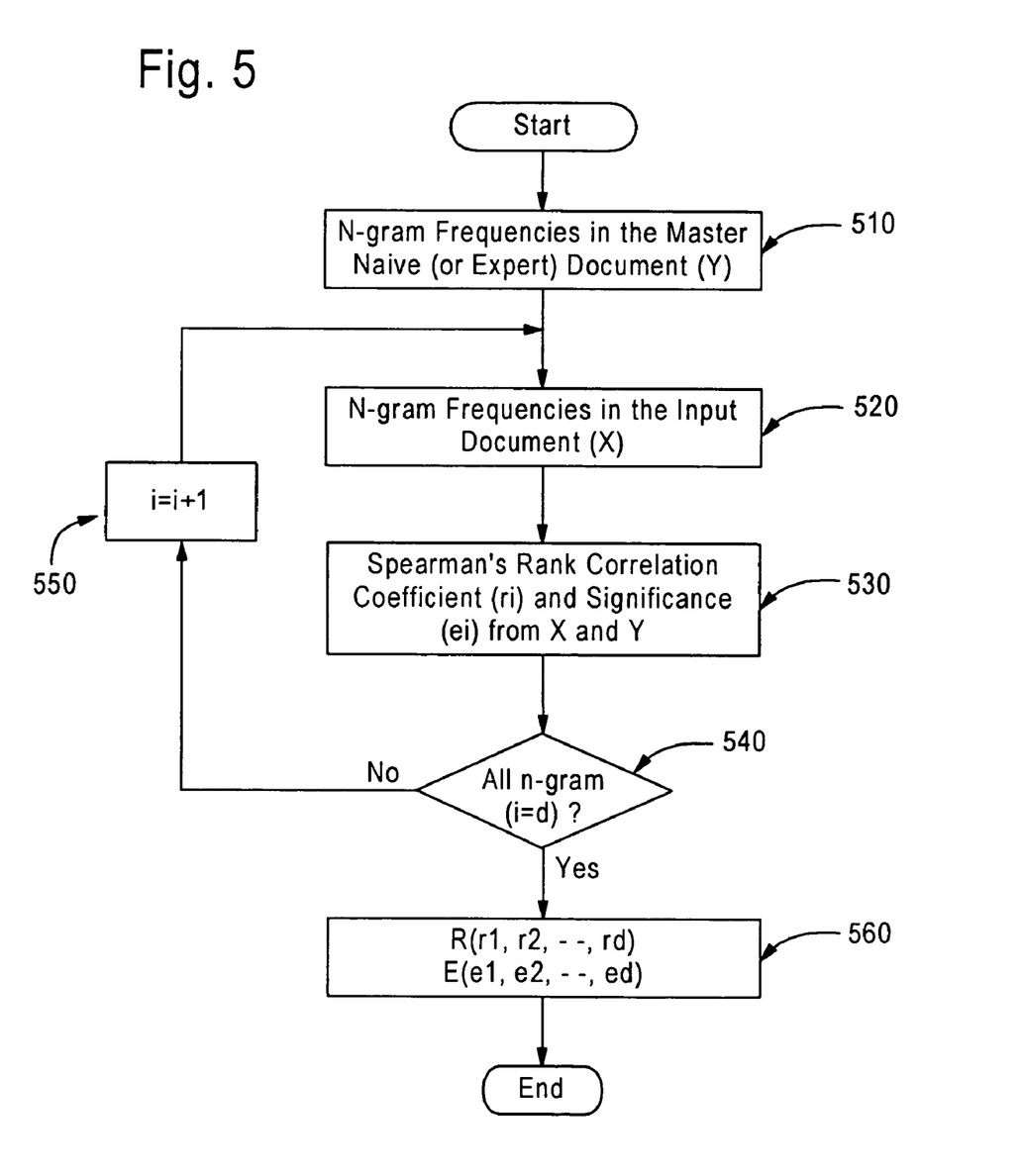
FIG. 5 is a flowchart of a method employed by the apparatus of FIG. 2 for calculating rank correlation coefficients and significance values of documents.

The calculation of the rank correlation coefficient and its significance value based upon Spearman's formula is described in the following. FIG. 5 is a flowchart of operations the computer of FIG. 2 performs for calculating the rank correlation coefficient and its significance value based upon Spearman's formula.

510: N-gram frequencies in the master naive document (Y)

520: N-gram frequencies in the input document (X)

530: Calculate the Spearman's Rank Correlation Coefficient (ri) and Significance value (ei) according to X and Y 540: Confirm calculation for all n-grams 550: Set next n-gram 560: Obtain rank correlation coefficients and significance values for all n-grams The rank correlation coefficient/significance is hereinafter described in detail.

Content-word uni-grams are used as the example for explanation. They are used to calculate correlations between documents on the basis of frequencies of single words. In the case of the wine domain, frequencies of words such as "wine", "flavor", and "drink" are calculated from selected documents and a master naive document set (or a master expert document set). These frequency figures are designated as $Y(y1,y2,y3,\ldots,yh)$ (step 510).

Next, similar feature values are calculated from an input document; and the similar feature values are designated as $X(x1,x2,x3,\ldots,xh)$ (step 520). Here, h represents the number of data or word types for which frequencies are calculated. Rank correlation coefficients and significance values are calculated on the basis of Spearman's formula from these data.

$$r1 = F(X,Y)$$

$$e1 = G(X,Y),$$

where r1 is a rank correlation coefficient calculated in accordance with Spearman's Correlation Coefficient Formula, and e1 is a significance value of the rank correlation coefficient calculated in accordance with Spearman's Significance Formula (step 530).

In the same manner, r2, e2 are calculated for the content-word bi-grams, and similarly for other n-grams. Also, rank correlation coefficients and significance values are calculated for the particle/auxiliary word n-grams in the same manner (steps 540 and 550). As a result, $R=(r1,r2,\ldots,rd)$ and $E=(e1,e2,\ldots,ed)$ are calculated (step 560). Here, d represents the total number of content-word n-grams and particle/auxiliary-word n-grams.

In this embodiment, the Spearman's correlation coefficients and their significance values are calculated for four kinds of content-word n-gram; namely, content-word uni-grams, content-word bi-grams, content-word tri-grams, and content-word skip bi-grams. Therefore, eight feature values are calculated as the Spearman's Correlation coefficients and their significance values. Similarly, eight feature values are calculated as the Spearman's Correlation Coefficients and their significance values based upon particles/auxiliary words. Adding the above-mentioned five feature values, 21 (=5+8+8) feature values are used in all.

Figure 6:
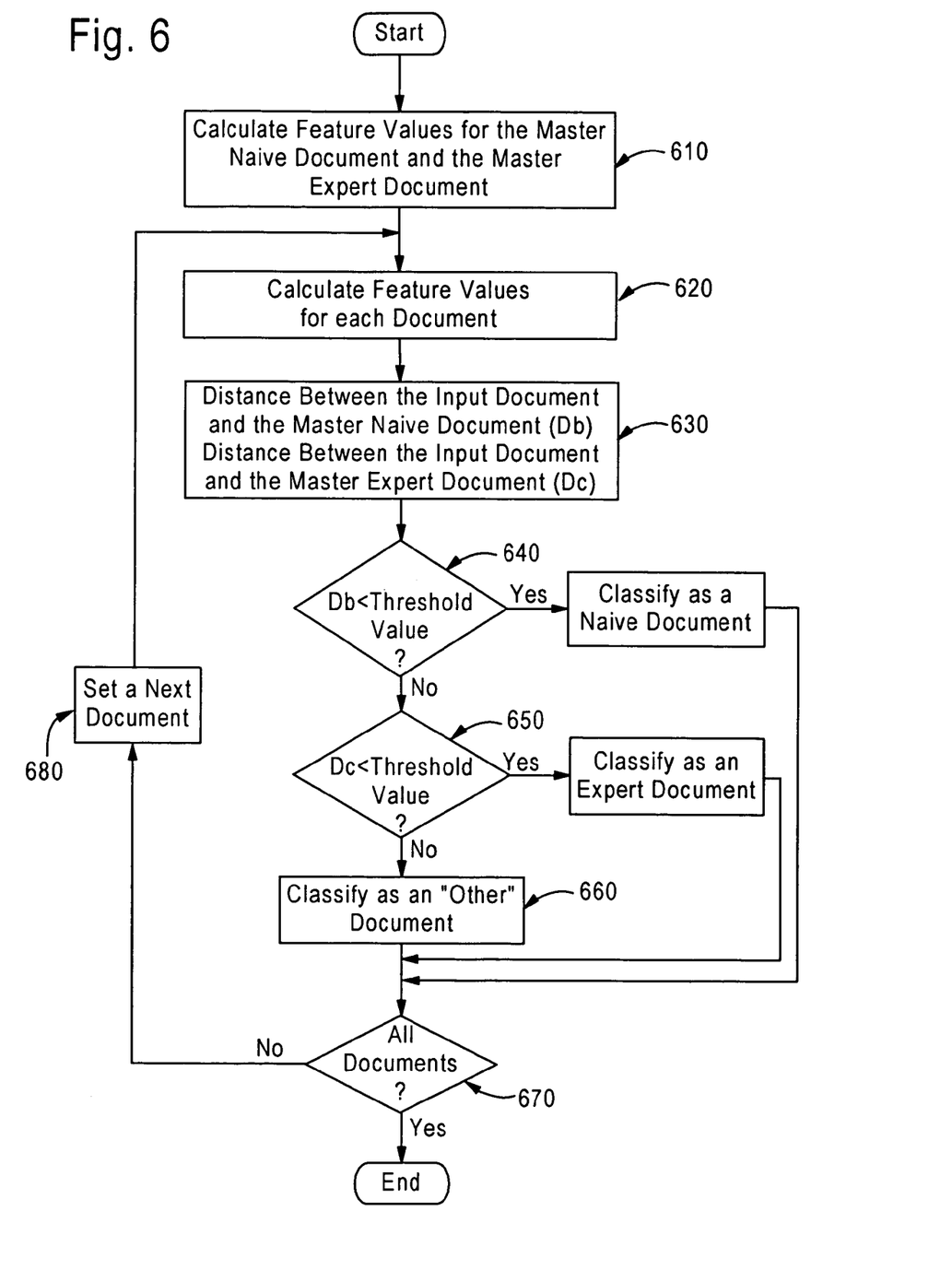
FIG. 6 is a flowchart of a method employed by the apparatus of FIG. 2 for classifying documents as expert documents and naive documents.

Next, Mahalanobis' distance function is used to distinguish input documents to classify the input documents into naive documents or expert documents. FIG. 6 is a flowchart of operations the computer of FIG. 2 performs for classifying input documents into naive documents, expert documents and other documents.

610: Calculate feature values for the master naive documents and the master expert documents 620: Calculate feature values for each input document 630: Calculate the distance between the input document and the master naive documents (Db) and the distance between the input document and the master expert documents (Da)

640: If the distance between the input document and the master naive documents is smaller than a threshold value, the input document is classified as a naive document.

650: If the distance between the input document and the master expert documents (Da) is smaller than the threshold values, the input document is classified as an expert document.

660: A document, which does not correspond to the master naive documents or the master expert documents, is classified as an "other" document.

670: Confirm that all documents are classified

680: Set the next document

The respective steps are described in detail in the following. First, feature values for the master naive documents and the master expert documents are calculated. These constitute base populations for respective sets when a discriminant is used to discriminate documents. The master naive documents are a set of documents that have prominent features as a master naive document selected out of the "master naive document set". Feature values of respective documents constituting the master naive document are calculated, and the averages of the feature values are calculated. The master expert document is also selected out of the "master expert document set", and feature values of respective documents are calculated, and the averages of the feature values are calculated in the same manner (step 610).

Next, feature values of the input document are calculated (step 620). The distance between the input document and the master naive document (Db) is calculated using Mahalanobis' formula (expression 1) by employing the feature values of the input document and the feature values of the master naive document. Similarly, the distance between the input document and the master expert document (Dc) is calculated with Mahalanobis' formula (expression 2) using the feature values of the input document and the feature values of the master expert document (step 630).

$$Db = (A-B)^t \Sigma b^{-1}(A-B) \quad \text{(Expression 1)}$$

$$Dc = (A-C)^t \Sigma c^{-1}(A-C) \quad \text{(Expression 2)}$$

where: A represents the feature values obtained from the respective documents and is expressed as $A^t = (a1, a2, \ldots, ap)$, B represents the average values of the feature values of the naive documents and is expressed as $B^t = (b1, b2, \ldots bp)$, C represents the average values of the feature values of the expert documents and is expressed as $C^t = (c1, c2, \ldots, cp)$, p represents the number of dimensions of a feature vector, t represents the transposition of a matrix. $\Sigma b$ and $\Sigma c$ represent covariance matricies of the respective sets, and $\Sigma b^{-1}$ and $\Sigma c^{-1}$ represent reverse matricies of the covariance matricies.

If Db is smaller than a predetermined threshold value, the document is classified as a naive document (step 640). If Dc is smaller than the predetermined threshold value, the document is classified as an expert document (step 650).

A document which is classified as neither a naive document nor an expert document is considered to be unclassifiable and is regarded as an "other" document (step 660).

The above steps are executed for all the documents (steps 670 and 680).

(6) Detect Corresponding Terms Between the Naive Document and the Expert Document As a result of the above processing, a document pair consisting of an N document and an E document describing a specific common topic can be obtained. Associations between terms used in the N (naive) document and the E (expert) document are hereinafter described.

Different terms are used in the naive document (N document) and the expert document (E document). However, since the documents describe the common topic, it can be surmised that corresponding terms having similar meanings are used. Thus, a method of identification of pairs of words having similar meanings from the E document and the N document can be developed. The method does the following: detect a list of naive words that correspond to an r-th word Er in the E document, and detect a list of expert words that correspond to an i-th word Ni in the N document. The details are described below.

(I) Maximum Likelihood Ratio Test

Figure 7:
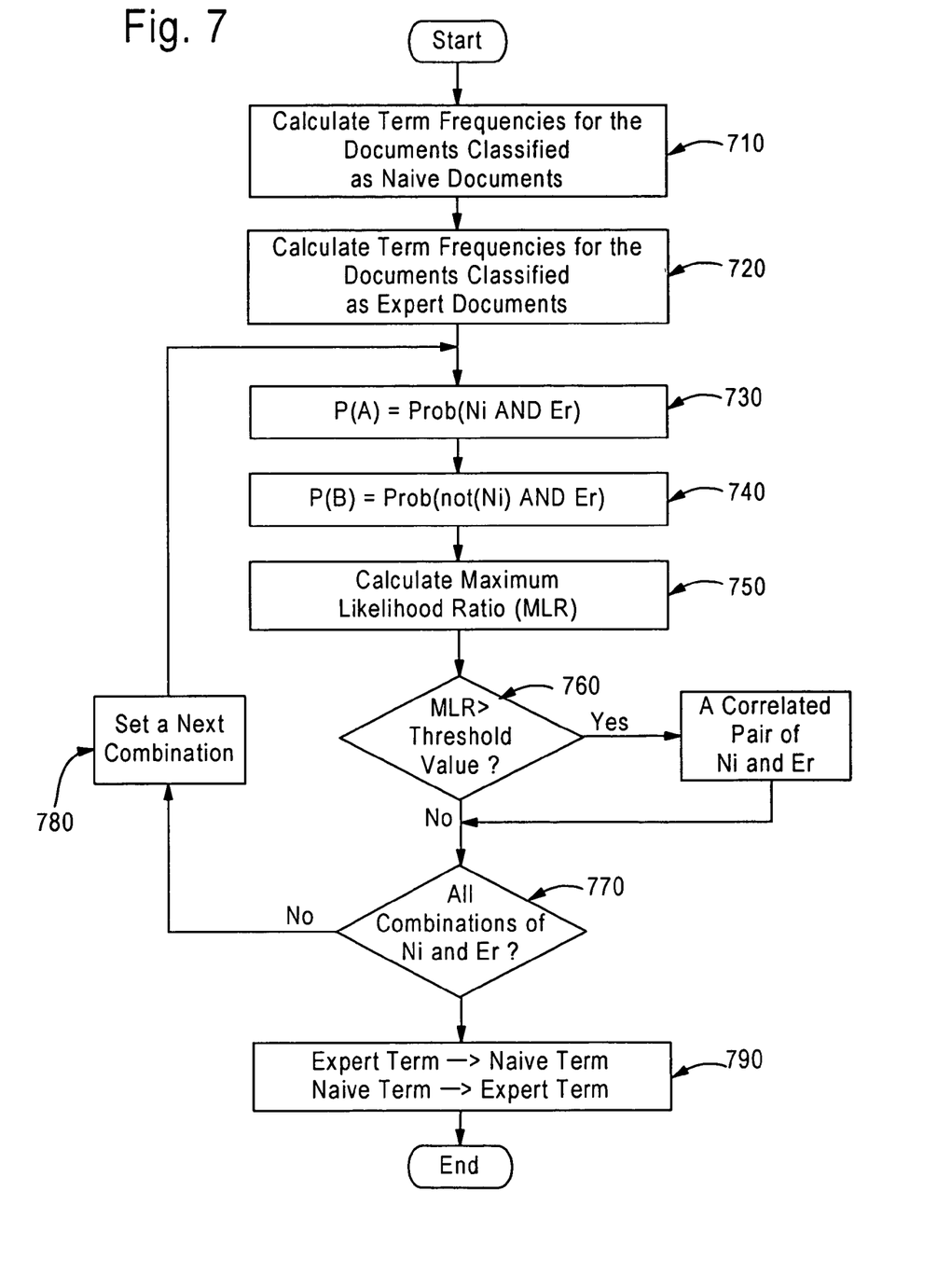
FIG. 7 is a flowchart of a method employed by the apparatus of FIG. 2 for performing a lexical mapping using the MLR method.

First, a calculation method using the Maximum Likelihood Ratio Test is described. FIG. 7 is a flowchart of operations the computer of FIG. 2 performs in connection with the Maximum Likelihood Ratio (MLR) Test.

710: Calculate frequencies of respective terms for the documents classified as naive documents

720: Calculate frequencies of respective terms for the documents classified as expert documents

730: Calculate P(A)=Prob(Ni AND Er)

740: Calculate P(B)=Prob(Not (Ni) AND Er)

750: Calculate MLR based on P(A) and P(B)

760: Extract combinations of (Ni) and (Er) with MLR exceeding a threshold value

770: Confirm that calculations are performed for all the combinations

780: Set the next combination

790: Detect corresponding terms from both directions

A method the system of FIG. 1 uses to detect the maximum likelihood ratio is described specifically by reference to the flowchart of FIG. 7.

Consider the following situation: Assume (1) m terms are extracted from the document N and an i-th term of N is Ni, (2) n terms are extracted from the document E and its r-th term is Er, and (3) Ni and Er co-occur frequently. In other words, it is assumed that Er occurs frequently when Ni occurs frequently, and Er occurs rarely when Ni occurs rarely. Conditions for determining that the probability of such a situation is too high to be regarded as coincidence are described. In addition, a method of expressing the degree of confidence of the probability with a numerical value will be described.

A method of finding corresponding expert terms (terms in the E documents) for naive terms (terms in the N documents) is described below.

Consider a pair of documents that are extracted on the basis of one theme and classified as naive documents or expert documents. Rather than processing all terms in the naive documents and the expert documents, terms which should be subjected to processing are determined in advance. The naive term list and the expert term list prepared for this purpose store those terms that correspond to respective domains. The naive term list stores expressions pertaining to human sensations and subjective judgments.

The expert term list stores terms that meet the following criteria:

(a) Terms included in the term list and terms related to those terms (b) Terms not included in the naive term list (c) Terms appearing at a frequency equal to or higher than a predetermined frequency Assume there are n terms from the naive term list which appear in the naive documents, and the i-th term of the naive term list is Ni (i=1 to m). The frequency of the i-th term is counted (step 710). Similarly, assume there are m terms in the expert document among terms in the naive term list and the r-th term of the expert list is Er (r=1 to n). The frequency of the r-th term of the expert term list is counted (step 720). A unit for counting the frequencies is one of term uni-gram, term bi-gram or term tri-gram. The probability of co-occurrence of Ni and Er P(A) (step 730) and the probability of occurrence of Ni and nonoccurrence of Er P(B) (step 740) are defined as follows on the basis of frequencies of Ni and Er in the respective documents.

$$P(A) = \text{Prob}(Ni|Er)$$

$$P(B) = \text{Prob}(\text{Not}(Ni)|Er)$$

Next, the maximum likelihood ratio (MLR) is calculated (step 750). MLR is calculated as the ratio of (1) the probability P(H0), which is the probability in the case where it is assumed there is no difference between P(A) and P(B) (null hypothesis), and (2) the probability P(H1), which is the probability in the case where it is assumed there is a difference (alternative hypothesis). MLR is calculated by considering the term pair (Ni and Er) in question to be two random processes according to the binomial distribution. An expression for calculating a binomial distribution probability for one random variable is given as follows.

(Formula 3) [Equation 1]

$$b(p, k, n) = \binom{n}{k} p^k (1-p)^{(n-k)}$$

where: k represents the number of actual appearances of a certain word, n represents the maximum possible number of appearances of the word, and p represents the basic appearance probability. If the assumed probability in the case of H0 (null hypothesis) is p0, an assumed maximum probability of P(A) in the case of H1 (alternative hypothesis) is p1, and an assumed maximum probability of P(B) is p2, the ratio of P(H0) to P(H1) is expressed as:

(Formula 4) [Equation 2]

$$\lambda = \frac{P(H0)}{P(H1)} = \frac{b(p0, k1, n1) b(p0, k2, n2)}{b(p1, k1, n1) b(p2, k2, n2)}$$

The values of k1, n1, k2, and n2 are calculated easily from the number of appearances of the word. The MLR for the likelihood ratio is:

(Formula 5) $MLR = -2 \log \lambda$ [Equation 3]

It is generally known that the MLR substantially follows a chi-squared distribution with a degree of freedom of 1. If this is utilized, it is easy to set the threshold value. In other words, if the value of MLR exceeds a certain numerical value, it can be said that the two terms Ni and Er co-occur at a probability that is too high to be regarded as coincidence (step 760).

Utilizing the foregoing principles the computer of FIG. 2 uses the following method to select candidates for lexical mapping: After calculating the MLR with respect to a combination of all target terms, that is, {(Ni, Er) i=1 to m, r=1 to n} (steps 770 and 780), choose pairs that exceed a predetermined threshold value, e.g., a level of 5%, in the descending order of the numerical values. Terms in the expert list that correspond to an i-th term in N with a value of the MLR exceeding the threshold value are retrieved, and a predetermined number of terms among the terms are selected in the descending order of the values of MLR, whereby expert terms that correspond to naive terms are obtained (step 780).

Next, the method that the computer of FIG. 2 uses to find corresponding naive terms (terms in the N document) from expert terms (terms in the E document) is described.

In a similar fashion as above, terms in N that correspond to an r-th term in E with a value of MLR exceeding the threshold value are retrieved from the stored lists, and a predetermined number of terms among the terms are selected in the descending order of the values of MLR, whereby naive terms that correspond to expert terms are obtained (step 780).

(ii) Method Based Upon Calculation of a Lexical Mapping Matrix

Next, a method based upon calculation of a lexical mapping matrix T with weight adjustments according to the length and term frequency of documents is described.

Figure 9:
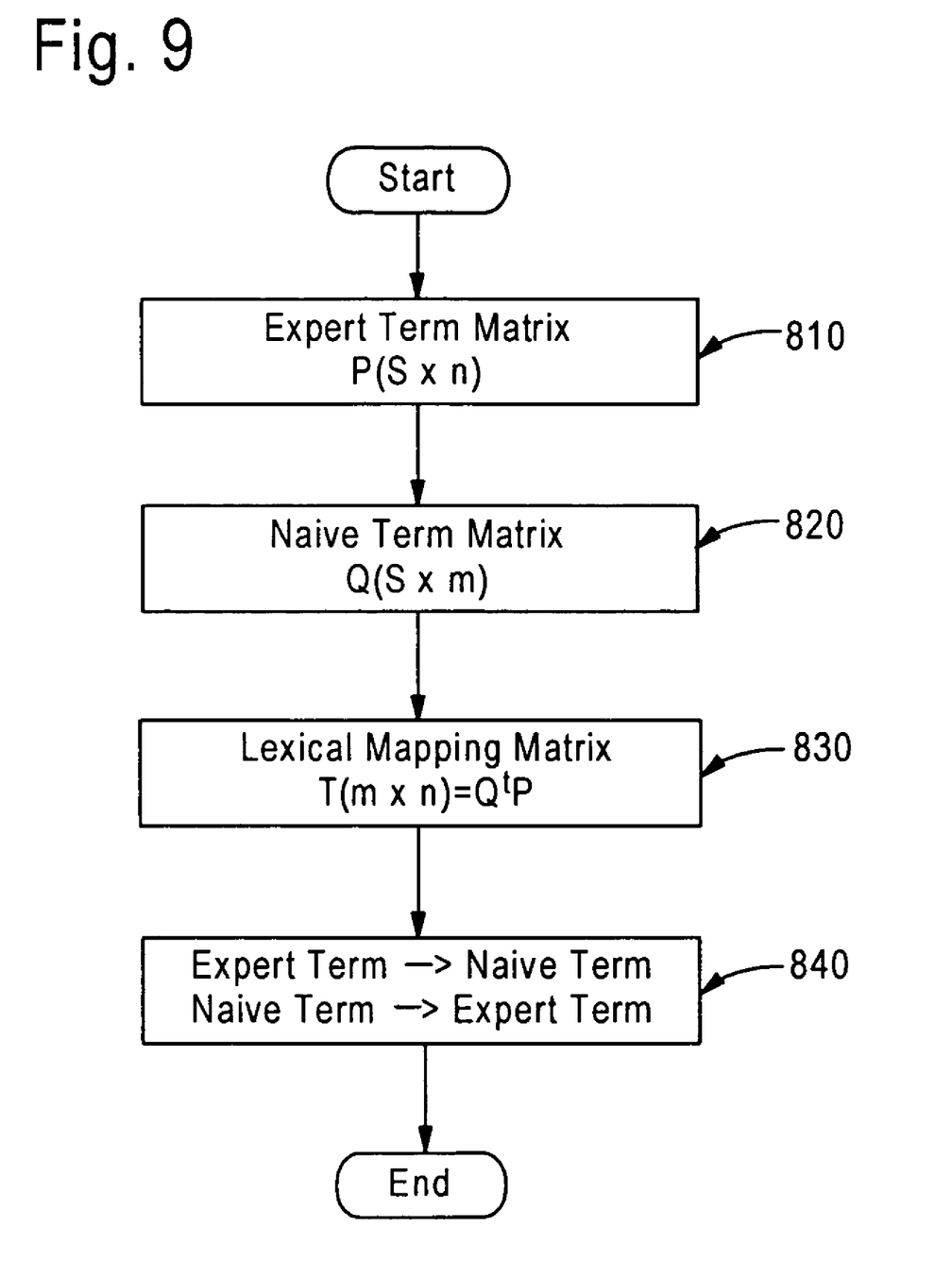
FIG. 9 is an algorithm employed by the apparatus of FIG. 2 for calculating the lexical mapping matrix of FIG. 8c.

FIG. 9 is a flowchart of operations the system of FIG. 1 performs in connection with lexical mapping matrix.

810: Create an s-by-n expert term matrix P
820: Create an s-by-m naive term matrix Q
830: Calculate an m-by-n lexical mapping matrix T
840: Convert naive terms into expert terms, and convert expert terms into naive terms The respective steps 810-840 are hereinafter described in detail. First, an expert term matrix P is created from a document set classified as expert documents. Documents retrieved with the k-th term (k=1 to s) in the term list as a keyword are considered here. Those documents classified as the expert documents are processed to calculate frequencies of terms used in the documents.

Terms to be processed are terms in the above-mentioned expert term list. The above-mentioned operations are applied to documents which are retrieved for all the terms in the term list and which are classified as the expert documents, whereby frequencies of terms that correspond to the terms in the expert term list are calculated. The s-by-n matrix $P_0$ (not shown) representing the frequencies of expert terms is calculated, assuming n is the number of terms in the expert documents.

Similarly, when m is assumed to be the number of terms in the naive documents, an s-by-m matrix $Q_0$ (not shown) representing frequencies of naive terms is calculated.

The strengths of connection between two words which have co-occurred with each other should be higher, but high-frequency words often co-occur with many other words. For this reason, it is necessary to discount the importance of such words as candidates for lexical mapping. Similarly, when one document is long and contains a large number of words, the importance of single words occurring in such a document has to be discounted.

Figure 8A:
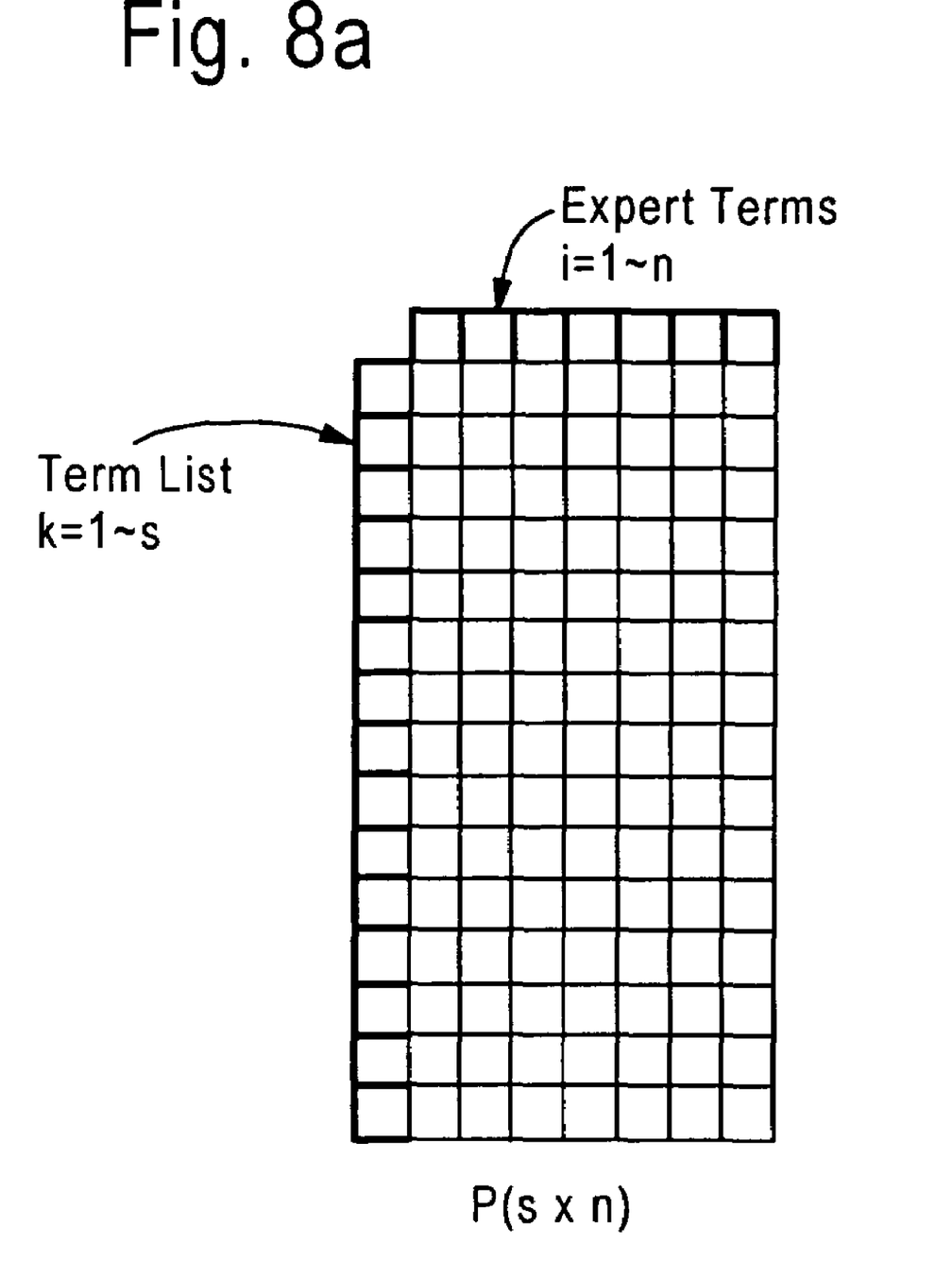
FIG. 8a is a diagram of an expert term matrix.

Thus, an s-by-n expert term matrix (FIG. 8*a*) is created (step 810) by converting each of the elements We(k,i) of the matrix $P_0$ as follows:

$$We(k, i) = \frac{Exp(k, i)}{(Etf(i) * Ewf(k))}$$ [Equation 4]

where the frequency of a word appearing in a k-th document of expert documents is Exp(k,i), the frequency of a word in all of the documents is Etf(i), and the total number of words appearing in the k-th document is Ewf(k).

Figure 8B:
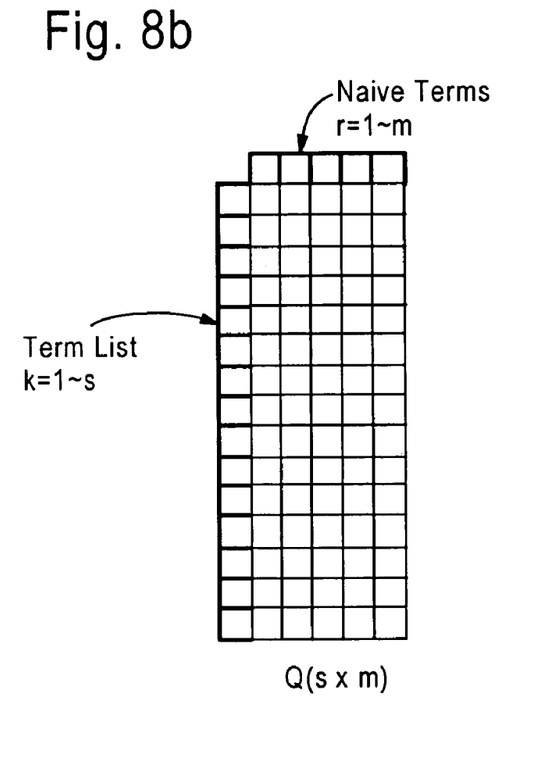
FIG. 8b is a diagram of a naive term matrix.

Similarly, an s-by-in naive term matrix Q (FIG. 8*b*) is created (step 820) by converting each of the elements Wn(k,r) of the matrix $Q_0$ as follows:

$$Wn(k, r) = \frac{Naive(k, r)}{(Ntf(r) * Nwf(k))}$$ [Equation 5]

where the frequency of a word appearing in the k-th document of naive documents is Naive (k,r), the frequency of the word in all the documents is Ntf(r), and the total number of words appearing in the k-th document is Nwf(k).

Figure 8C:
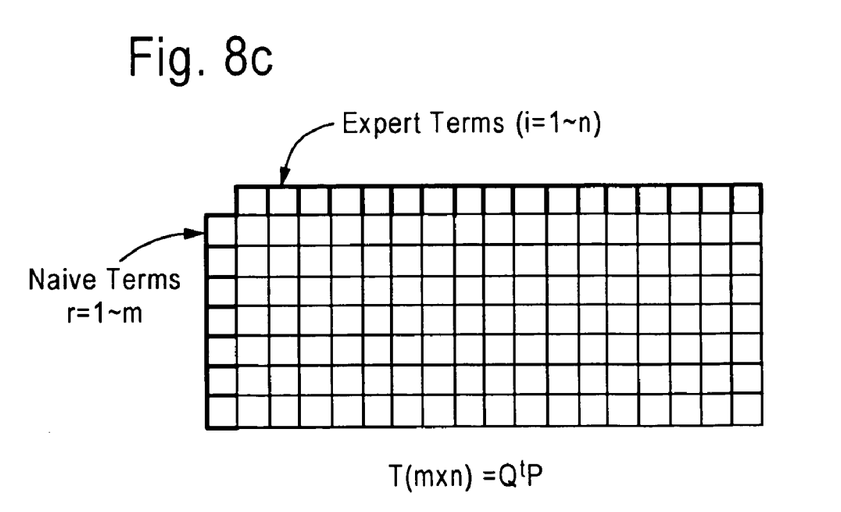
FIG. 8c is a diagram of a lexical mapping matrix.

The purpose of creating the s-by-n matrix P and the s-by-m matrix Q is to calculate weight values indicating strengths of combination of those respective words to obtain the m-by-n lexical mapping matrix T. Thus, the matrix T is defined as follows:

$$T = Q^t P.$$

where t represents the transposition of a matrix, and each weight value of the lexical mapping matrix T is defined as follows:

$$W(r, i) = \sum_{k=1}^{s} \left[ \frac{Exp(k, i)}{(Etf(i) * Ewf(k))} \frac{Naive(k, r)}{(Ntf(r) * Nwf(k))} \right]$$ [Equation 6]

Candidate words for mapping are extracted from the lexical mapping matrix. For example, to extract candidates of an expert term that corresponds to Ni of an i-th naive term, it is sufficient to refer to the i-th row of the lexical mapping matrix T and to select the desired number of terms in a descending order of weight values (step 840).

On the other hand, to extract candidates of a naive term that corresponds to an r-th expert term, it is sufficient to refer to the r-th row of the lexical mapping matrix T and select the desired number of terms in a descending order of weight values (step 840). In both cases, ten words with the highest weight values, excluding those with the value of zero, are preferably chosen as candidate words.

However, since the ten chosen candidate words may include unnecessary information, the method may not be necessarily practical. Thus, a method of further filtering candidate terms using the terms included in the term list can be employed. For example, only data for "wine names" described in the term list will remain in the output. In addition, it is also possible to select naive term candidates which satisfy preference information of non-experts. For example, it is possible to output non-expert terms representing preference information with uni-grams such as "karakuchi (dry)", "shitazawari-ga-yoi (good texture)", and "ajiwai-bukai (tasteful)", or "wine names" that correspond to bi-gram combinations of terms representing non-experts. Consequently, "wine names" that match preferences of non-experts can be found on the basis of the non-expert preference information. Output examples after the application of this filtering are discussed below.

Sample results of retrieval are shown below.

The following examples are samples of expert terms retrieved as those that correspond to naive terms. When the domain "nihonshu (Japanese rice wine)" was searched at Japanese Internet sites, the following naive (non-expert) terms were detected: "atsui (heavy)", "yutaka (rich)", "tanrei (light and fine)", "sararito(smooth)", "bimi (tasty)", "fukami (depth)", etc. Expert terms that correspond to these naive terms resulted in retrieval of the following wine names: "Isojiman" for "heavy" and "rich", "Koshinokanbai" for "light and fine" and "smooth", and "Kamomidori" for "tasty" and "depth", respectively.

When the "wine" domain was searched at Japanese Internet sites, the following non-expert terms were detected: "bimi (tasty)", "koi (thick)", "umami (tastiness)", "suppai (sour)", "shitazawari (texture)", "kire (sharpness)", "pittari (exact fit)", "fukami (depth)", "sawayaka (fresh)", "yawaraka (soft)", "maroyaka(smooth and soft)", etc. Expert terms that correspond to those naive terms resulted in retrieval of the following wine names: "Au Bon Climat" for "tasty", "thick", "tastiness", "sour", etc., and "Zonnebloem" for "texture", "sharpness", "fit", "depth, "fresh", "soft", "smooth and soft", etc.

The following examples are sample naive terms that were detected as those that correspond to expert terms.

When the domain of "nihonshu (Japanese rice wine)" was searched at Japanese Internet sites, the following expert terms, which are wine names, were detected: "Kagatobi", "Hanano-mai", "Kakubuto", and so on. Naive terms that were retrieved as those that correspond to these wine names included the following: "oishii (delicious), mizumizushii (refreshing)" for "Kagatobi", "johin (elegant), tanrei (light and fine)" for "Hanano-mai", and "nameraka (soft and mellow), sawayaka (cool and fresh), subarashii (wonderful)" for "Kakubuto."

When the "wine" domain was searched at Japanese sites, the following expert terms, which are wine names, were detected: "Coltassala", "Sansoniere", and so on. Naive terms that were retrieved as those that correspond to these wine names included the following: "awai (translucent), kihin(elegance), honoka(faint), karui (light), kokochiyoi (comfortable)" for "Coltassala", and "horonigai (slightly bitter), karai (dry), johin (elegant), yuuga (grace)" for "Sansoniere".

With both lexical mapping methods described above, it is possible to select candidate terms that correspond to specific terms in both directions of N->E(Non-expert to Expert) and E->N by choosing terms in the descending order of their weight values.

What is claimed is:

1. A computer readable storage medium comprising instructions recorded thereon for causing a computer to perform a method of detecting, from a first document set and a second document set having a common topic, at least one of (a) terms in the second document set that correspond to specific terms in the first document set, and (b) terms in the first document set that correspond to specific terms in the second document set, the first and second document sets having been retrieved on the basis of a term list, said instructions comprising:

creating a first term matrix from the first document set on the basis of the frequency of each term listed in a first term list;

creating a second term matrix from the second document set on the basis of the frequency of each term listed in a second term list;

calculating a lexical mapping matrix from a product of the first term matrix and the second term matrix;

selecting a predetermined number of terms in a specific row in the lexical mapping matrix in a descending order of values of elements to adopt the selected terms in the specific row as terms in the first document set that correspond to the specific terms in the second document set; and selecting a predetermined number of terms in a specific column in the lexical mapping matrix in the descending order of elements to adopt the selected terms in the specific column as terms in the second document set that correspond to the specific terms in the first document set;

wherein: (a) the number of terms in the term list is s, (b) the number of terms selected from the first document set is n, (c) the first term matrix is represented by an s-by-n matrix P, (d) the frequency of the i-th term in the k-th document of the first document set is $Exp(k,i)$, (e) the overall frequency of the i-th term is $Etf(i)$, and (f) the total number of terms in the k-th document is $Ewf(k)$, each of the elements ($We(k,i)$) of the matrix P is given by:

$$We(k, i) = \frac{Exp(k, i)}{(Etf(i) * Ewf(k))} \quad \text{[Equation 1]}$$

(g) the number of terms selected from the second document set is m, (h) the second term matrix is represented by an s-by-m matrix Q, and (i) the frequency of the r-th term appearing in the k-th document of the second document set is $Naive(k,r)$, (j) the overall frequency of the r-th term is $Ntf(r)$, and (k) the total number of terms in the k-th document is $Nwf(k)$, each of the elements ($Wn(k,r)$) of the matrix Q is given by:

$$Wn(k, r) = \frac{Naive(k, r)}{(Ntf(r) * Nwf(k))}. \quad \text{[Equation 2]}$$

2. A computerized document processing system comprising a processor for performing the instructions of claim 1.

3. The computer readable storage medium according to claim 1, further comprising instructions for:

calculating weight values indicating strengths of combinations each term to obtain an m-by-n lexical mapping matrix T, which is defined as:

$T=Q^t P$, wherein t represents the transposition of a matrix, and each weight value of the lexical mapping matrix T (W(r,i)) is defined as:

$$W(r, i) = \sum_{k=1}^{S} \left[ \frac{Exp(k, i)}{(Etf(i)*Ewf(k))} \frac{Naive(k, r)}{(Ntf(r)*Nwf(k))} \right].$$

4. A computerized document processing system comprising a processor for performing the instructions of claim 3.

5. A method of detecting, from a first document set and a second document set having a common topic, at least one of (a) terms in the second document set that correspond to specific terms in the first document set, and (b) terms in the first document set that correspond to specific terms in the second document set, the first and second document sets having been retrieved on the basis of a term list, said method comprising steps executed by a processor, the steps comprising:

creating a first term matrix from the first document set on the basis of the frequency of each term listed in a first term list;

creating a second term matrix from the second document set on the basis of the frequency of each term listed in a second term list;

calculating a lexical mapping matrix from a product of the first term matrix and the second term matrix;

selecting a predetermined number of terms in a specific row in the lexical mapping matrix in a descending order of values of elements to adopt the selected terms in the specific row as terms in the first document set that correspond to the specific terms in the second document set;

selecting a predetermined number of terms in a specific column in the lexical mapping matrix in the descending order of elements to adopt the selected terms in the specific column as terms in the second document set that correspond to the specific terms in the first document set; and outputting the selected predetermined number of terms in the specific row and the selected predetermined number of terms in the specific column in the lexical mapping matrix, wherein: (a) the number of terms in the term list is s, (b) the number of terms selected from the first document set is n, (c) the first term matrix is represented by an s-by-n matrix P, (d) the frequency of the i-th term in the k-th document of the first document set is Exp(k,i), (e) the overall frequency of the i-th term is Etf(i), and (f) the total number of terms in the k-th document is Ewf(k), each of the elements (We(k,i)) of the matrix P is given by:

$$We(k, i) = \frac{Exp(k, i)}{(Etf(i)*Ewf(k))} \qquad \text{[Equation 1]}$$

(g) the number of terms selected from the second document set is m, (h) the second term matrix is represented by an s-by-m matrix Q, and (i) the frequency of the r-th term appearing in the k-th document of the second document set is Naive (k,r), (j) the overall frequency of the r-th term is Ntf(r), and (k) the total number of terms in the k-th document is Nwf(k), each of the elements (Wn(k,r)) of the matrix Q is given by:

$$Wn(k, r) = \frac{Naive(k, r)}{(Ntf(r)*Nwf(k))}. \qquad \text{[Equation 2]}$$

6. The method according to claim 5, said steps further comprising:

calculating weight values indicating strengths of combinations each term to obtain an m-by-n lexical mapping matrix T, which is defined as:

$T=Q^t P$ wherein t represents the transposition of a matrix, and each weight value of the lexical mapping matrix T (W(r,i)) is defined as:

$$W(r, i) = \sum_{k=1}^{S} \left[ \frac{Exp(k, i)}{(Etf(i)*Ewf(k))} \frac{Naive(k, r)}{(Ntf(r)*Nwf(k))} \right];$$

and outputting the calculated weight values.

7. A computerized document processing system comprising a processor for performing the method of claim 5.

8. A computerized document processing system comprising a processor for performing the method of claim 6.

9. A computer readable storage medium comprising a set of instructions stored thereon for causing a computer to perform the method of claim 5.

10. A computer readable storage medium comprising a set of instructions stored thereon for causing a computer to perform the method of claim 6.

* * * * *